United States Patent
Bisaglia et al.

(10) Patent No.: US 8,363,760 B2
(45) Date of Patent: Jan. 29, 2013

(54) METHOD FOR ESTIMATING THE SIGNAL-TO-NOISE RATIO FOR PACKET TRANSMISSION AND RECEPTION SYSTEMS OF SIGNALS BASED ON M-DPSK MODULATIONS AND APPARATUS THEREOF

(75) Inventors: Paola Bisaglia, Padova (IT); Simone Bois, Valgrisenche (IT); Eleonora Guerrini, Aosta (IT)

(73) Assignee: Dora S.p.A., Aosta (IT)

( * ) Notice: Subject to any disclaimer, the term of this patent is extended or adjusted under 35 U.S.C. 154(b) by 619 days.

(21) Appl. No.: 12/646,348

(22) Filed: Dec. 23, 2009

(65) Prior Publication Data
US 2010/0166101 A1 Jul. 1, 2010

(30) Foreign Application Priority Data
Dec. 23, 2008 (IT) ................ MI2008A2304

(51) Int. Cl.
*H03D 1/06* (2006.01)
(52) U.S. Cl. ............ 375/346; 375/148; 455/226.3
(58) Field of Classification Search ............ 375/147, 375/148, 144, 267, 340, 346, 347, 350; 455/501, 455/63.1, 67.11, 67.13, 226.1–226.3, 296
See application file for complete search history.

(56) References Cited

U.S. PATENT DOCUMENTS

| | | | |
|---|---|---|---|
| 7,356,071 B2 * | 4/2008 | Li et al. | 375/147 |
| 8,135,079 B2 * | 3/2012 | Park et al. | 375/260 |
| 2007/0002980 A1 * | 1/2007 | Krupka | 375/346 |

OTHER PUBLICATIONS

Chen et al., "Maximum Likelihood SNR Estimators for Digital Receivers, " IEEE Pacific Rim Conference on Communications, Computers and Signal Processing, Victoria, BC, Canada, Aug. 24, 2005, pp. 637-640.
Guerrieri et al., "LLR-based bit-loading algorithm for the turbo coded HomePlug AV," IEEE Global Telecommunications Conference, Nov. 1, 2007, pp. 140-145.

* cited by examiner

*Primary Examiner* — Dac Ha
(74) *Attorney, Agent, or Firm* — Seed IP Law Group PLLC

(57) ABSTRACT

A method of estimating a signal-to-noise ratio from a received M-DPSK modulated signal, comprising a sequence of N known symbols, based on a division of the known symbols N and of N samples of the received signal at the output of the channel into a number of blocks B of length L with B greater than one.

35 Claims, 12 Drawing Sheets

METHOD FOR ESTIMATING THE SIGNAL-TO-NOISE RATIO FOR PACKET TRANSMISSION AND RECEPTION SYSTEMS OF SIGNALS BASED ON M-DPSK MODULATIONS AND APPARATUS THEREOF

BACKGROUND

1. Technical Field

The present disclosure relates to a method for estimating the signal-to-noise ratio for packet transmission and reception systems of signals based on M-ary differential phase shift keying (M-DPSK) modulations, for example for systems based on receivers of the non-coherent type with differential demodulator, and an apparatus thereof.

2. Description of the Related Art

In the present communication systems using adaptive modulations for ensuring a certain quality of service (QoS), maximizing the spectral efficiency may be advantageous. The key idea of the adaptive modulation is reacting to the changes of the channel conditions by using strong modulation schemes in the case of bad channel conditions and employing less strong modulation schemes in the case of good channel conditions for increasing the transmission speed. The adaptive modulations may be employed both in single carrier systems and in multiple carrier systems, in both cases a reliable estimation of the channel conditions is needed, for example an estimation of the signal-to-noise ratio (SNR), in order to choose the modulation to be employed.

The apparatuses for estimating the signal-to-noise ratio or SNR estimators may be divided in two categories: "data aided" estimators and "not data aided" estimators i.e., the estimators acting on a known data sequence and those acting on an unknown data sequence. The present data aided SNR estimators applied to non-coherent receivers at the input of a differential demodulator do not allow good estimations of the signal-to-noise ratio to be obtained in the presence of impairments that cause a progressive phase shifting of the received constellation symbols. An example of such impairments is the presence of frequency offsets, between transmitter and receiver, on the carrier frequency. On the other hand, the present data aided SNR estimators applied to non-coherent receivers at the output of a differential demodulator are stronger against those impairments, such as carrier frequency offsets, but more sensitive to the noise.

BRIEF SUMMARY

In an embodiment a method is provided for estimating the signal-to-noise ratio for packet transmission and reception systems of signals based on M-DPSK modulations which allows good estimation values to be obtained even in the presence of impairments that cause a progressive phase shifting of the received constellation symbols. An example of such impairments is the presence of carrier frequency offsets.

In an embodiment, a method for estimating the signal-to-noise ratio for a packet transmission and reception system of signals having a known sequence with M-DPSK modulation with at least one carrier, said system comprising the packet transmission of the signal with the sequence of N known symbols, N being a positive integer number, said transmission comprising a M-DPSK modulation of the signal to be transmitted by means of a M-PSK mapper and a differential block, the transmission of the M-DPSK modulated signal through a channel having a constant gain over all the N symbols and in the presence of noise with null average, and the reception of the signal at the output of the channel, comprises the estimation of the signal-to-noise ratio from the N samples ($r_k$) of the received signal ($r(t)$), comprising the sequence of known N symbols, and from the known N transmitted symbols ($a_k$) both divided into B blocks of L length, with B and L being positive integer numbers, and B greater than one, and the calculation of the estimation of the signal-to-noise ratio by means of the equation:

$$SNR = \left(1 - \frac{1}{L}\right) \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}$$

where $l_b = L \cdot b + l$, $l$ is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a_k^*$ is the complex conjugate of the M-DPSK known transmitted symbol and SNR indicates the estimation of the signal-to-noise ratio.

In an embodiment, if the length L of the B blocks is sufficiently great to average the noise, said estimation of the signal-to-noise ratio is given by:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2}.$$

For example, in an embodiment when the length L is greater than a threshold, the signal-to-noise ratio may be estimated using the above equation.

In an embodiment, the B blocks are expressed by $$B = \frac{N-L}{L-O} + 1 \geq \frac{N}{L}$$

wherein O indicates the overlapping factor of consecutive blocks having length L, said estimation of the signal-to-noise ratio being given by:

$$SNR = \frac{\frac{(L-1)}{B \cdot L}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}.$$

In an embodiment, the transmission and reception system is of the pass-band type and the reception is of the non-coherent type with differential demodulation, the estimation of the signal-to-noise ratio is effectuated before the differential demodulation of the signal.

In an embodiment, the transmission and reception system is of the multiple carrier type.

In an embodiment, an apparatus for estimating the signal-to-noise ratio for a packet transmission and reception system of signals having a known data sequence by means of a M-DPSK modulation with at least one carrier, said system comprising means for the packet transmission of the signal with the sequence of N known symbols, with N positive integer number, said transmission means comprising a M-DPSK modulator of the signal to transmit comprising a M-PSK mapper and a differential block, said M-DPSK modulated signal being adapted to pass through a channel having constant gain over all the N symbols and in presence of noise with null average, said system comprises means for receiving the signal at the output of the channel, said apparatus comprising first means adapted to divide the N known symbols ($a_k$) and N samples ($r_k$) of the received signal (r(t)) into B blocks of L length with B and L positive integer numbers, and B greater than one, and second means adapted to calculate the estimation of the signal-to-noise ratio by means of the equation:

$$SNR = \left(1 - \frac{1}{L}\right) \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}$$

$$= \frac{(L-1) \sum_{b=0}^{B-1} \left| \frac{1}{L} \sum_{k=l_b}^{l_b+L-1} r_k a_k^* \right|^2}{\sum_{k=l}^{l+N-1} |r_k|^2 - L \sum_{b=0}^{B-1} \left| \frac{1}{L} \sum_{k=l_b}^{l_b+L-1} r_k a_k^* \right|^2} - \frac{1}{L}$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, if the length L of the blocks B is sufficient great to average the noise said second means are adapted to calculate the estimation of the signal-to-noise ratio by the equation:

$$SNR = \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2}$$

In an embodiment, the first means are adapted to overlap consecutive blocks having length L of a factor O, said B blocks being expressed by $$B = \frac{N-L}{L-O} + 1 \geq \frac{N}{L}$$

wherein O indicates the overlapping factor of consecutive blocks having length L, said second means being adapted to effectuate the estimation of the signal-to-noise ratio by the equation:

$$SNR = \frac{\frac{(L-1)}{B \cdot L} \sum_{b=0}^{B-1} \left| \frac{1}{L} \sum_{k=l_b}^{l_b+L-1} r_k a_k^* \right|^2}{\frac{1}{B} \sum_{b=0}^{B-1} \frac{1}{L} \sum_{k=l_b}^{l_b+L-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}.$$

In an embodiment, the transmission and reception system is of the pass-band type, said reception means of the signal effectuating a non-coherent reception and comprising a differential demodulator, said estimation apparatus being adapted to calculate the estimation of signal-to-noise ratio of the signal at the input of the differential demodulator.

In an embodiment, the transmission and reception system is of the multiple carrier type.

In an embodiment, a packet transmission and reception system of signals having a known data sequence by means of a M-DPSK modulation with at least one carrier, said system comprising means for the packet transmission of the signal with the sequence of N known symbols, with N positive integer number, said transmission means comprising a M-DPSK modulator of the signal to transmit comprising a M-PSK mapper and a differential block, said M-DPSK modulated signal being adapted to pass through a channel having constant gain over all the N symbols and in presence of noise with null average, said system comprising means for receiving the signal at the output of the channel which comprises a differential demodulator, characterized by comprising an apparatus to effectuate the estimation of the signal-to-noise ratio of the signal at the input of said differential demodulator.

In an embodiment, a method comprises: receiving a modulated signal, the signal comprising a sequence of N known symbols modulated using M-ary Differential Phase Shift Keying (M-DPSK) modulation with at least one carrier; and estimating, using at least one processor, a signal-to-noise ratio of the received modulated signal based on a division of the N known symbols ($a_k$) and of N samples ($r_k$) of the received signal (r(t)) into a number of blocks B of a length L, with N, B and L being positive integer values and B greater than one.

In an embodiment, the estimation of the signal-to-noise ratio based on the number of blocks B and the length L comprises estimating the signal-to-noise ratio based on the complex conjugate of the M-DPSK modulated known symbols.

In an embodiment, the estimation of the signal-to-noise ratio based on the number of blocks B and the length L, and B greater than one, is performed according to:

$$SNR = \left(1 - \frac{1}{L}\right) \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}$$

$$= \frac{(L-1) \sum_{b=0}^{B-1} \left| \frac{1}{L} \sum_{k=l_b}^{l_b+L-1} r_k a_k^* \right|^2}{\sum_{k=l}^{l+N-1} |r_k|^2 - L \sum_{b=0}^{B-1} \left| \frac{1}{L} \sum_{k=l_b}^{l_b+L-1} r_k a_k^* \right|^2} - \frac{1}{L}$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, when the length L of the blocks B is greater than a threshold, the estimation of the signal-to-noise ratio is given by:

$$SNR = \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2},$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, $$B = \frac{N-L}{L-O} + 1 \geq \frac{N}{L}$$

wherein O indicates an overlapping factor of consecutive blocks having length L, and estimation of the signal-to-noise ratio being given by:

$$SNR = \frac{\frac{(L-1)}{B \cdot L} \sum_{b=0}^{B-1} \left| \frac{1}{L} \sum_{k=l_b}^{l_b+L-1} r_k a_k^* \right|^2}{\frac{1}{B} \sum_{b=0}^{B-1} \frac{1}{L} \sum_{k=l_b}^{l_b+L-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L},$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, the method further comprises: filtering the received modulated signal; and applying non-coherent type differential demodulation to the filtered signal after estimation of the signal-to-noise ratio. In an embodiment, the at least one carrier comprises multiple carriers.

In an embodiment, an apparatus comprises: a module configured to obtain a number B of blocks of a length L based on a division of a number N of known symbols, and of a number N of samples of the received signal at the output of the channel with N, B and L being positive integer values, and B greater than one; and an estimator configured to estimate, based on the number of blocks B and the length L, a signal-to-noise ratio of a received signal comprising the sequence of the N known symbols modulated using M-ary Differential Phase Shift Keying (M-DPSK) modulation with at least one carrier signal.

In an embodiment, the module configured to obtain the number of blocks B comprises a divider configured to divide the N known symbols and N samples of the received signal into the number of blocks B of the length L, and B greater than one.

In an embodiment, the estimator is configured to estimate the signal-to-noise according to:

$$SNR = \left(1 - \frac{1}{L}\right) \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}$$

$$= \frac{(L-1) \sum_{b=0}^{B-1} \left| \frac{1}{L} \sum_{k=l_b}^{l_b+L-1} r_k a_k^* \right|^2}{\sum_{k=l}^{l+N-1} |r_k|^2 - L \sum_{b=0}^{B-1} \left| \frac{1}{L} \sum_{k=l_b}^{l_b+L-1} r_k a_k^* \right|^2} - \frac{1}{L}$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, if the length L of the blocks B is greater than a threshold, the estimator is configured to estimate the signal-to-noise ratio according to $$SNR = \frac{\frac{1}{B} \sum_{b=0}^{B-1} \left| \frac{1}{L} \sum_{k=l_b}^{l_b+L-1} r_k a_k^* \right|^2}{\frac{1}{N} \sum_{k=l}^{l+N-1} |r_k|^2 - \frac{1}{B} \sum_{b=0}^{B-1} \left| \frac{1}{L} \sum_{k=l_b}^{l_b+L-1} r_k a_k^* \right|^2},$$

wherein $l_b = L \cdot b + l$, l is the index denoting the position of the first known symbol of the sequence of length N in the packet, $r_k$ is the sample of the received signal at the output of the channel correspondent to the known transmitted symbol, $a_k$ is the M-DPSK known transmitted symbol, $a^*_k$ is the complex conjugate of the M-DPSK known transmitted symbol and SNR indicates the estimation of the signal-to-noise ratio.

In an embodiment, the apparatus further comprises: a filter configured to filter the received signal; and a differential demodulator configured to demodulate the received signal and to receive as an input the estimated signal-to-noise ratio. In an embodiment, the at least one carrier signal comprises a plurality of carrier signals.

In an embodiment, a computer-readable memory medium's contents cause at least one processor to perform a method, the method comprising: obtaining a number of blocks B of a length L based on a division of a number of known symbols N and of a number N of samples of the received signal at the output of the channel into the number of blocks B of length L, with B, L and N positive integer values, and B greater than one; and estimating, based on the number of blocks B and the length L, a signal-to-noise ratio of a received signal comprising a sequence of the N known symbols modulated using M-ary Differential Phase Shift Keying (M-DPSK) modulation with at least one carrier signal. In an embodiment, the method further comprises differential demodulation of the received signal.

In an embodiment, the obtaining comprises dividing the N known symbols and N samples of the received signal at the output of the channel into the number of blocks B of length L, and B greater than one. In an embodiment, B is greater than N divided by L.

In an embodiment, a system comprises: a differential demodulator configured to demodulate a received signal comprising a sequence of N known symbols modulated using M-ary Differential Phase Shift Keying (M-DPSK) modulation with at least one carrier signal; and an estimator configured to estimate a signal-to-noise ratio of the received signal based on a division of the N known symbols and of N samples of the received signal at the output of the channel into a number of blocks B of length L, with N, B and L being positive integer values, and B greater than one.

In an embodiment, the estimator comprises a divider configured to divide the known symbols N and N samples of the received signal at the output of the channel into the number of blocks B of the length L, and B greater than one.

In an embodiment, the system further comprises a filter.

In an embodiment, the system further comprises a transmitter configured to transmit a signal, wherein the differential demodulator and the estimator are configured to receive the transmitted signal. In an embodiment, the system further comprises a transmitter configured to transmit modulated signals.

In an embodiment, a system comprises: means for obtaining a number of blocks B of a length L based on a division of a sequence of known symbols N and of N samples of the received signal at the output of the channel into the number of blocks B; and means for estimating, based on the number of blocks B and the length L, a signal-to-noise ratio of a received signal comprising a sequence of the N known symbols modulated using M-ary Differential Phase Shift Keying (M-DPSK) modulation with at least one carrier signal.

BRIEF DESCRIPTION OF THE SEVERAL VIEWS OF THE DRAWINGS

The features and advantages of embodiments will be apparent from the following detailed description of a practical embodiment thereof, shown by way of non-limiting example in the accompanying drawings, in which.

DETAILED DESCRIPTION

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
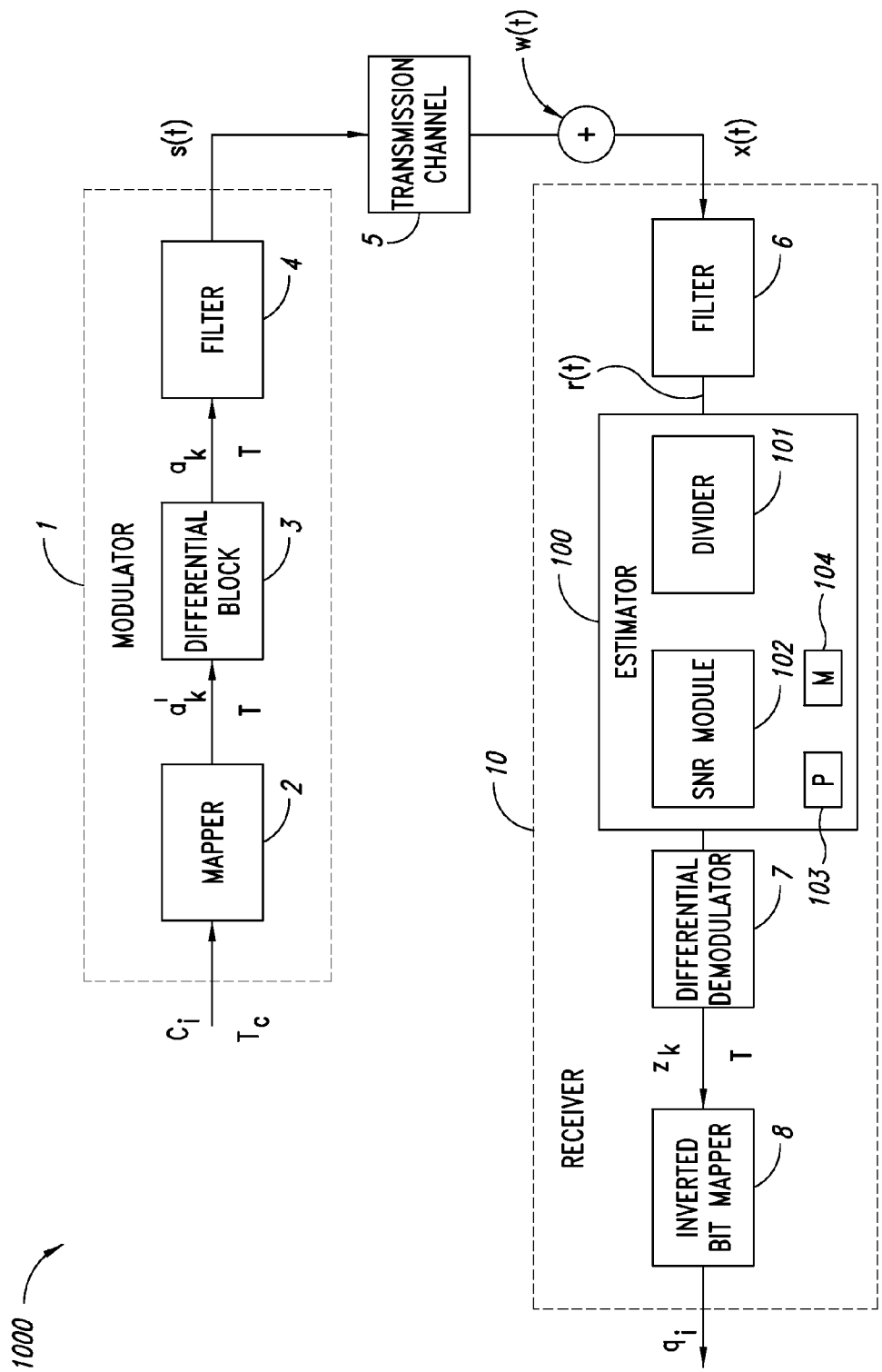
FIG. 1 is the equivalent base-band scheme of a pass-band packet transmission and reception system of the single carrier type with an M-DPSK modulator and demodulator and apparatus for estimating the signal-to-noise ratio according to an embodiment.

FIG. 1 shows the equivalent base-band scheme of a pass-band packet transmission and reception system 1000 of signals with a single carrier. The M-DPSK modulator 1 comprises an M-PSK bit mapper 2 where M is the modulation order, i.e., the number of possible constellation symbols. The mapper may comprise a serial-to-parallel converter followed by a map transforming a sequence of $\log_2 M$ bits $c_i$ into corresponding constellation points with values $a_k$ where:

$$a'_k = e^{j\varphi_k} = e^{j\frac{2\pi}{M}k}, k = 0, \ldots, M-1$$

and the modulation symbol period T is given by $T = T_c \log_2 M$ where $T_c$ is the information bit period. In the bit mapper comprising the M-PSK mapper 2 and the differential block 3, the phase $\delta_k$ associated with the symbol transmitted at the kT instant is the phase transmitted at the preceding instant (k−1)T, i.e., $\delta_{k-1}$, with a phase increase $\phi_k$ which may assume one of the M values belonging to the range $[0, 2\pi/M, \ldots, 2\pi(M-1)/M]$. Therefore, in the M-PSK bit mapper, the phase transmitted at the kT instant is given by: $\delta_k = \delta_{k-1} + \phi_k$. The modulated symbol at the output of the differential block 3 is $a_k = e^{j\delta_k}$. The receiver retrieves the transmitted data using the phase difference between consecutive samples without needing to retrieve the phase offset introduced by the channel and the phase offset between transmitter and receiver on the carrier frequency.

The symbol $a_k$ is associated with a limited-band $h_T(t)$ filter 4 so that at the output of filter 4 there is the signal $$s(t) = \sum_{i=-\infty}^{+\infty} a_i h_T(t - iT)$$

where the index k has been replaced by the index i; said signal is at the input of the transmission channel 5.

Assuming that the transmission channel 5 is a channel which is flat on the signal band and time-invariant with a constant gain $$g_{ch}(t) = G,$$

the signal at the output of the channel 5 still has a PSK structure; noise is added to the signal s(t), preferably an additive white Gaussian noise w(t) (AWGN) having a null average with double-sided spectral power density of $$N_0/2$$

Indicating the convolution by the symbol $\otimes$, and the frequency and phase offset on the carrier frequency between the transmitter and the receiver by $\Delta f$ and $\Delta\theta$, the signal x(t) at the output of the channel 5 and at the input of the receiver 10 is given by:

$$x(t) = (s \otimes g_{ch}(t) + w(t)) \cdot e^{j(2\pi\Delta ft + \Delta\theta)} G \cdot s(t) \cdot e^{j(2\pi\Delta ft + \Delta\theta)} \tilde{w}(t),$$

where $$\tilde{w}(t) = w(t) \cdot e^{j(2\pi\Delta ft + \Delta\theta)}.$$

Assuming that the frequency offset $\Delta f$ is sufficiently small and considering the filter 6 of the receiver with a function $h_R(t)$ at the output of the filter, the following equation is given $$r(t) = x \otimes h_R(t) \cong e^{j(2\pi\Delta ft + \Delta\theta)} \sum_{i=-\infty}^{+\infty} a_i h(t - iT) + n(t),$$

where $$h(t) = G \cdot (h_T \otimes h_R(t)) \text{ and } n(t) = \tilde{w} \otimes h_R(t).$$

At the sampling instant $kT + t_0$ where $t_0$ is the sampling phase the following equation is given $$r_k = G \cdot \left( e^{j[2\pi\Delta f(kT + t_0) + \Delta\theta]} \sum_{i=-\infty}^{+\infty} a_i h_{k-i} \right) + n_k,$$

where $$r_k = r(kT + t_0), h_k = h(kT + t_0) \text{ and } n_k = n(kT + t_0).$$

Assuming that the function $h_k = h(kT + t_0)$ satisfies the Nyquist condition:

$$h_{k-i} = \begin{cases} 1 & \text{if } k = i \\ 0 & \text{if } k \neq i \end{cases}$$

the following equation is given $$r_k = G \cdot a_k e^{j[2\pi\Delta f(kT + t_0) + \Delta\theta]} + n_k = G \cdot a_k e^{j[2\pi\Delta fkT + \Delta\phi]} n_k,$$

where $\Delta\phi = 2\pi\Delta f t_0 + \Delta\theta$.

The sampled signal $r_k$ is processed by a M-DPSK differential demodulator module 7 and sent to an inverted bit mapper 8 providing decisions on the received bits $q_i$.

The demodulator multiplies the sampled signal $r_k$ by its delayed and conjugated version $r^*_{k-1}$, where the symbol * indicates the complex conjugate, providing the sample $Z_k$ given by:

$$z_k = r_k \cdot r^*_{k-1}$$
$$= (G \cdot a_k e^{j(2\pi\Delta fkT + \Delta\phi)} + n_k)(G^* \cdot a^*_{k-1} e^{-j(2\pi\Delta f(k-1)T + \Delta\phi)} + n^*_{k-1})$$
$$= |G|^2 a_k a^*_{k-1} e^{j2\pi\Delta fT} + n_k \cdot n^*_{k-1} + G \cdot a_k e^{j(2\pi\Delta fkT + \Delta\phi)} \cdot$$
$$n^*_{k-1} + G^* \cdot a^*_{k-1} e^{-j(2\pi\Delta f(k-1)T + \Delta\phi)} \cdot n_k$$

where the normalized frequency offset is defined as $\Delta f_n = \Delta f \cdot T$.

The useful term i.e., the term $|G|^2 a_k a^*_{k-1} e^{j2\pi\Delta fT}$ is insensitive to the phase offset and, if $\Delta f_n$ is sufficiently small, the frequency offset may be neglected.

A disadvantage of some such differential demodulators is due to the fact that the term bonded to the noise is amplified. In order to avoid said disadvantage, the SNR estimators may act on the signal r(t) at the input of the M-DPSK block 7 of the receiver.

Considering an N sequence of samples $r_k$ consecutively received and l as the index denoting the position of the first known symbol of the sequence in the packet, assuming the channel gain G to be constant over the N samples and the number N to be sufficiently great so as to average out the noise, assumed as a null average, and that $|a_k|^2=1$ for unitary power PSK constellations, the following equation is given:

$$\frac{1}{N}\sum_{k=l}^{l+N-1}|r_k|^2 \cong |\hat{G}|^2 + \hat{\sigma}_n^2$$

where the values $\hat{G}$ and $\hat{\sigma}_n^2$ denote the channel estimation and the noise variance estimation, respectively. Assuming to have N available known symbols at the beginning of the useful transmission and an N sufficiently great, for example greater than 8 and in some embodiments equal to 32, such as to allow the noise, assumed as a null average, to be averaged out, the following equation is given:

$$\left|\frac{1}{N}\sum_{k=l}^{l+N-1} r_k a_k^*\right|^2 \cong \left|\frac{1}{N}\sum_{k=l}^{l+N-1} G \cdot e^{j(2\pi\Delta f_k T + \Delta\phi)}\right|^2$$

and assuming the channel gain to be constant over all the N symbols and the frequency offset $\Delta f_n$ to be negligible, i.e., $\Delta f_n l \cong \Delta f_n(l+N-1)$, the following equation is given:

$$\left|\frac{1}{N}\sum_{k=l}^{l+N-1} r_k a_k^*\right|^2 \cong |\hat{G}|^2$$

representing the estimation of the squared channel gain.

The estimation of the signal-to-noise ratio SNR is determined by:

$$SNR = \frac{\left|\frac{1}{N}\sum_{k=l}^{l+N-1} r_k a_k^*\right|^2}{\frac{1}{N}\sum_{k=l}^{l+N-1}|r_k|^2 - \left|\frac{1}{N}\sum_{k=l}^{l+N-1} r_k a_k^*\right|^2}$$

Figure 2:
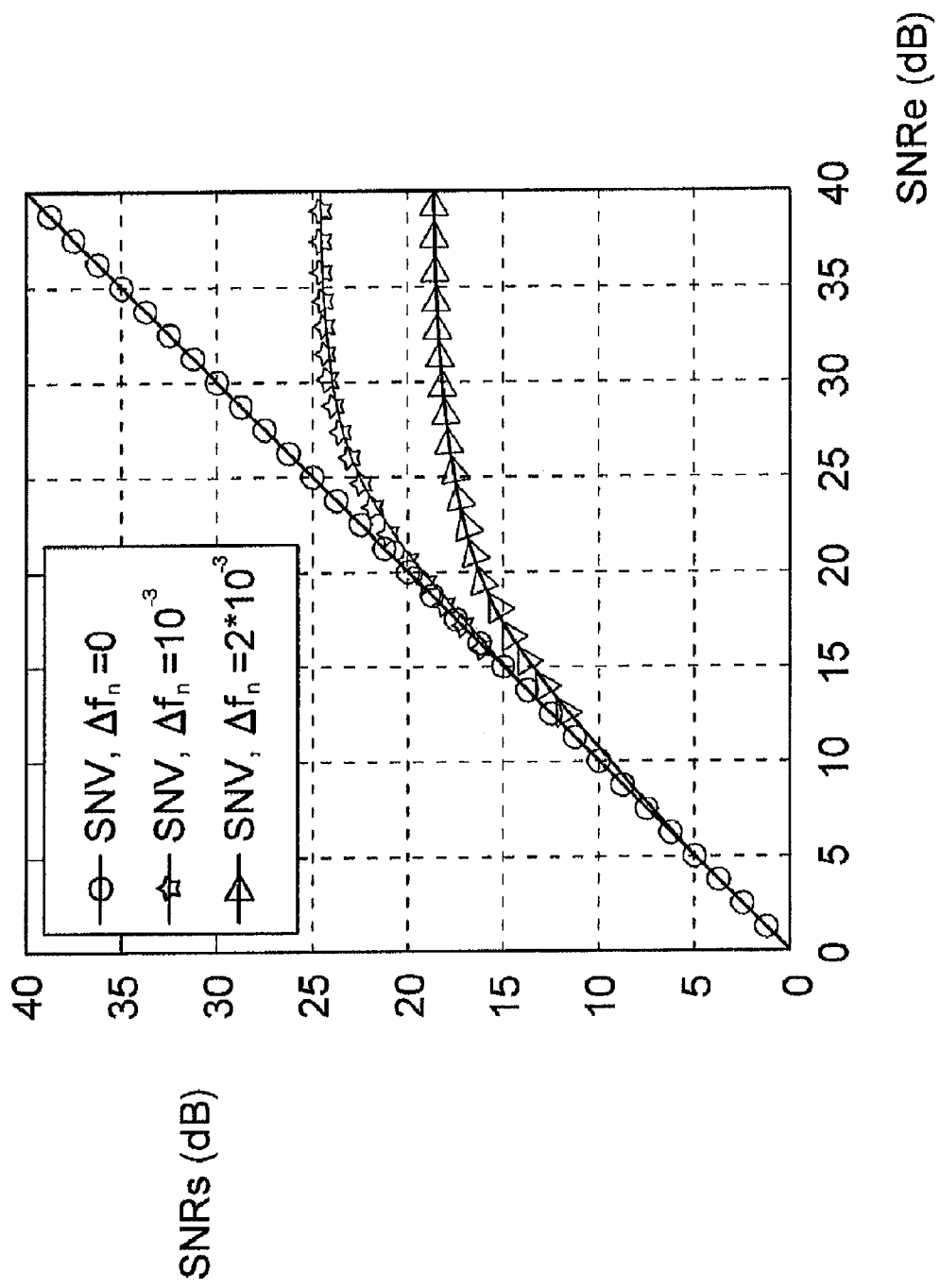
FIG. 2 is a graph of the estimated signal-to-noise ratio SNRs versus the exact value SNRe of an SNR estimator in accordance with the known art.
Figure 3:
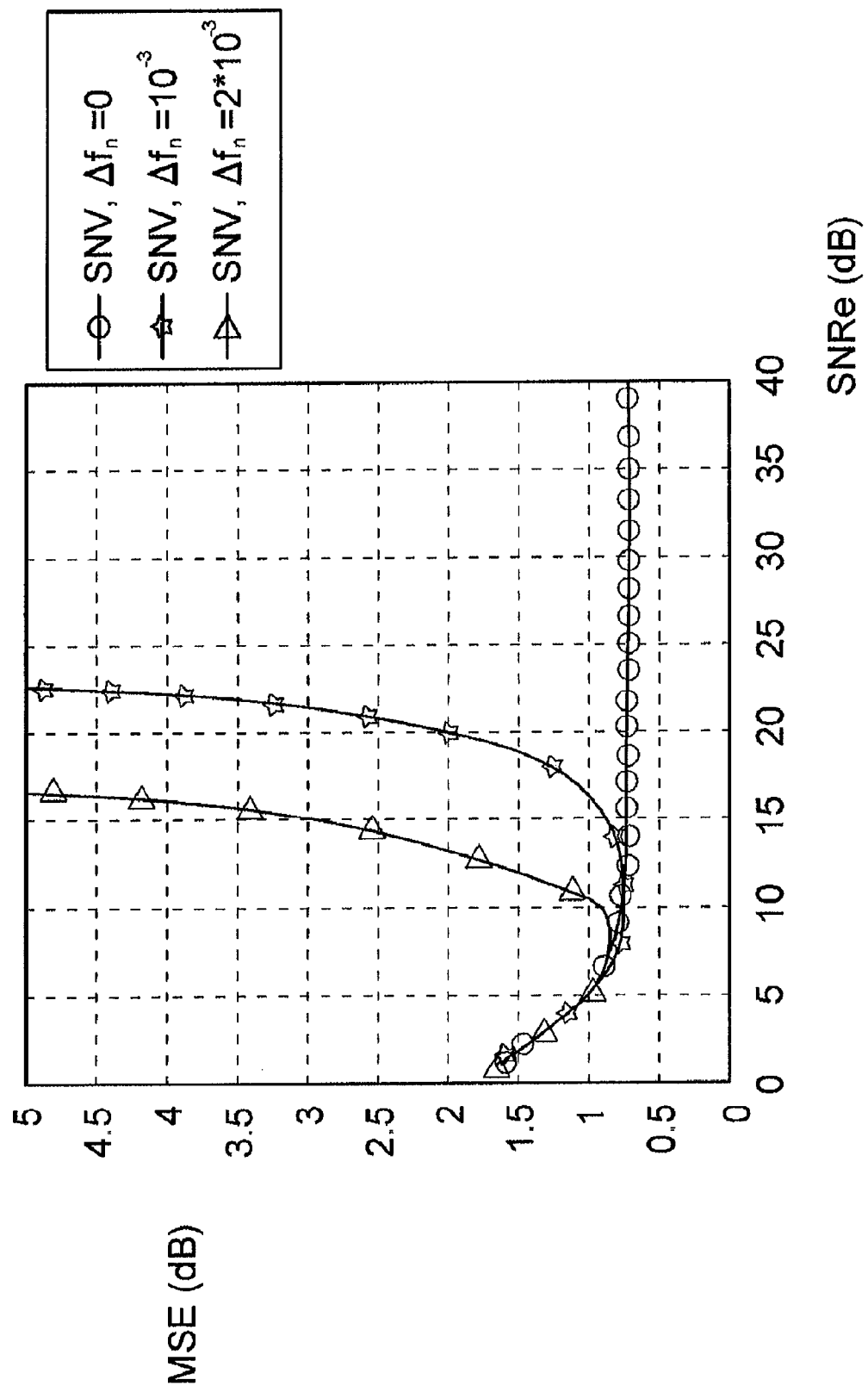
FIG. 3 is a graph of the mean square error MSE versus the exact value of the signal-to-noise ratio SNRe of the estimator in accordance with the known art.

In the presence of frequency offsets $\Delta f_n$, when the condition $\Delta f_n l \cong \Delta f_n(l+N-1)$ is no longer true and therefore the approximation $$\left|\frac{1}{N}\sum_{k=l}^{l+N-1} r_k a_k^*\right|^2 \cong |\hat{G}|^2$$

is no longer satisfied, the SNR estimation, indicated as SNV, degrades as shown in the graphs of FIGS. 2 and 3 relating to the estimated signal-to-noise ratio SNRs versus the exact value SNRe over various values of $\Delta f_n$ and to the mean square error MSE against the value SNRe over various values of $\Delta f_n$, respectively. As the frequency offset $\Delta f_n$ increases, the MSE error is noted to dramatically increase and the values of SNRs diverge from SNRe. In an embodiment, the N known symbols $a_k$ and the N samples $r_k$ consecutively received and corresponding to the known symbols $a_k$ are divided into B blocks of length L, N=B·L, i.e., the known sequence N and the N received samples now consist of B blocks of length L, with B greater than one. Estimator 100 comprises a divider module 101 allowing the N known symbols $a_k$ and the N samples $r_k$ consecutively received and corresponding to the known symbols $a_k$ to be converted into B blocks of length L. The following equation is given:

$$\frac{1}{B}\sum_{b=0}^{B-1}\left|\frac{1}{L}\sum_{k=l_b}^{l_b+L-1} r_k a_k^*\right|^2 == \frac{1}{B}\sum_{b=0}^{B-1}\left|\frac{1}{L}\sum_{k=l_b}^{l_b+L-1} Ge^{j(2\pi\Delta f_k T + \Delta\phi)} + \frac{1}{L}\sum_{k=l_b}^{l_b+L-1} n_k a_k^*\right|^2$$

where $l_b=L\cdot b+l$. Assuming the channel gain G to be constant over the L samples and the number L to be sufficiently great, for example, greater than 8, so as to allow the noise, assumed as a null average, to be averaged out, and the condition $$\Delta f_n l_b \cong \Delta f_n(l_b+L-1)$$

to be satisfied, the following approximation may be carried out:

$$\frac{1}{B}\sum_{b=0}^{B-1}\left|\frac{1}{L}\sum_{k=l_b}^{l_b+L-1} r_k a_k^*\right|^2 \cong \frac{1}{B}\sum_{b=0}^{B-1}|G_{l_b}|^2 \cong |\hat{G}|^2$$

The SNR estimator 100 comprises a SNR calculation block 102 configured to calculate the estimated signal-to noise ratio. For example, the estimated SNR may be calculated by the following equation:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2}$$

Figure 4:
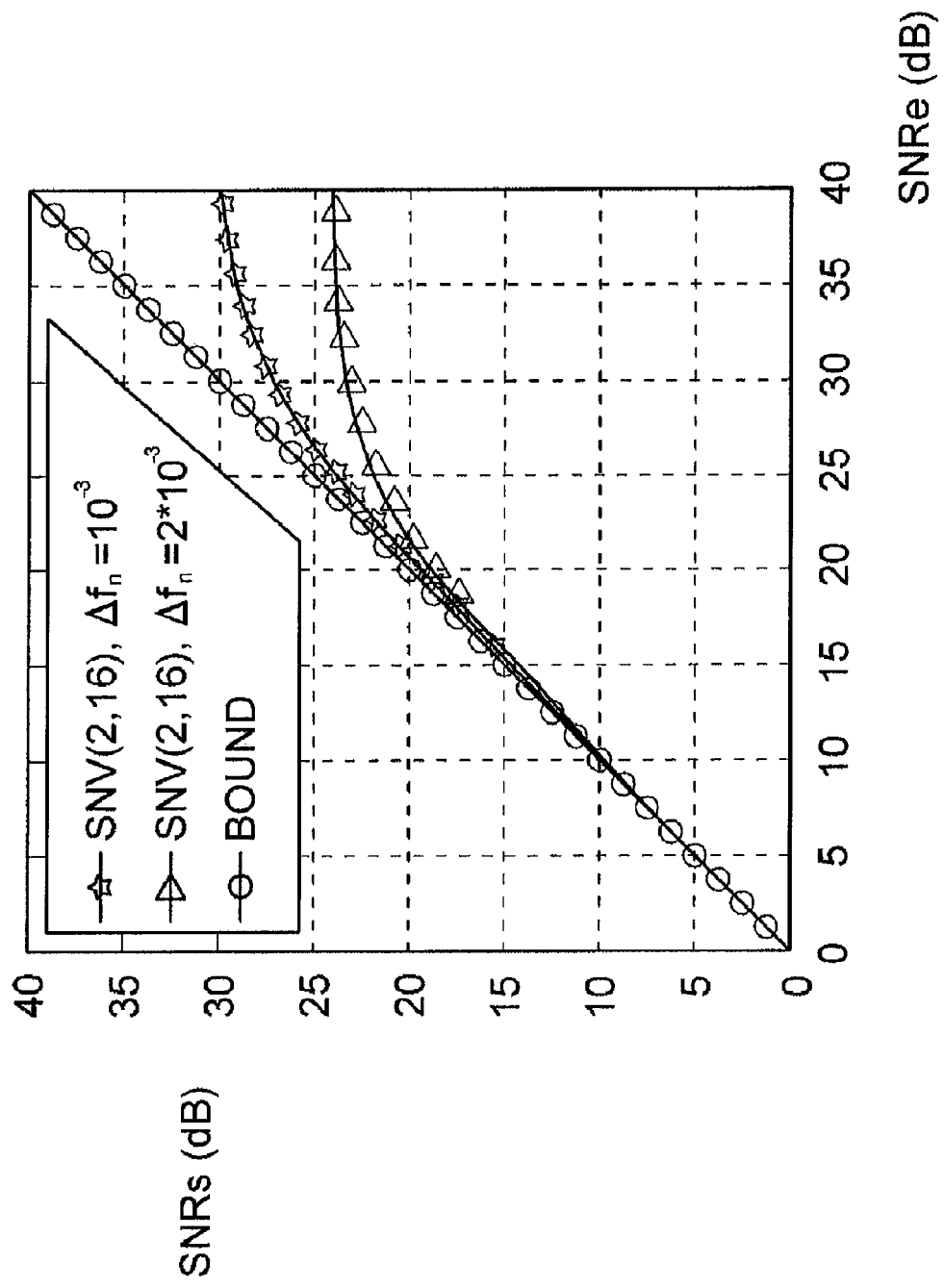
FIG. 4 is a graph of the estimated signal-to-noise ratio SNRs versus the exact value SNRe of the SNR estimator in accordance with an embodiment.
Figure 5:
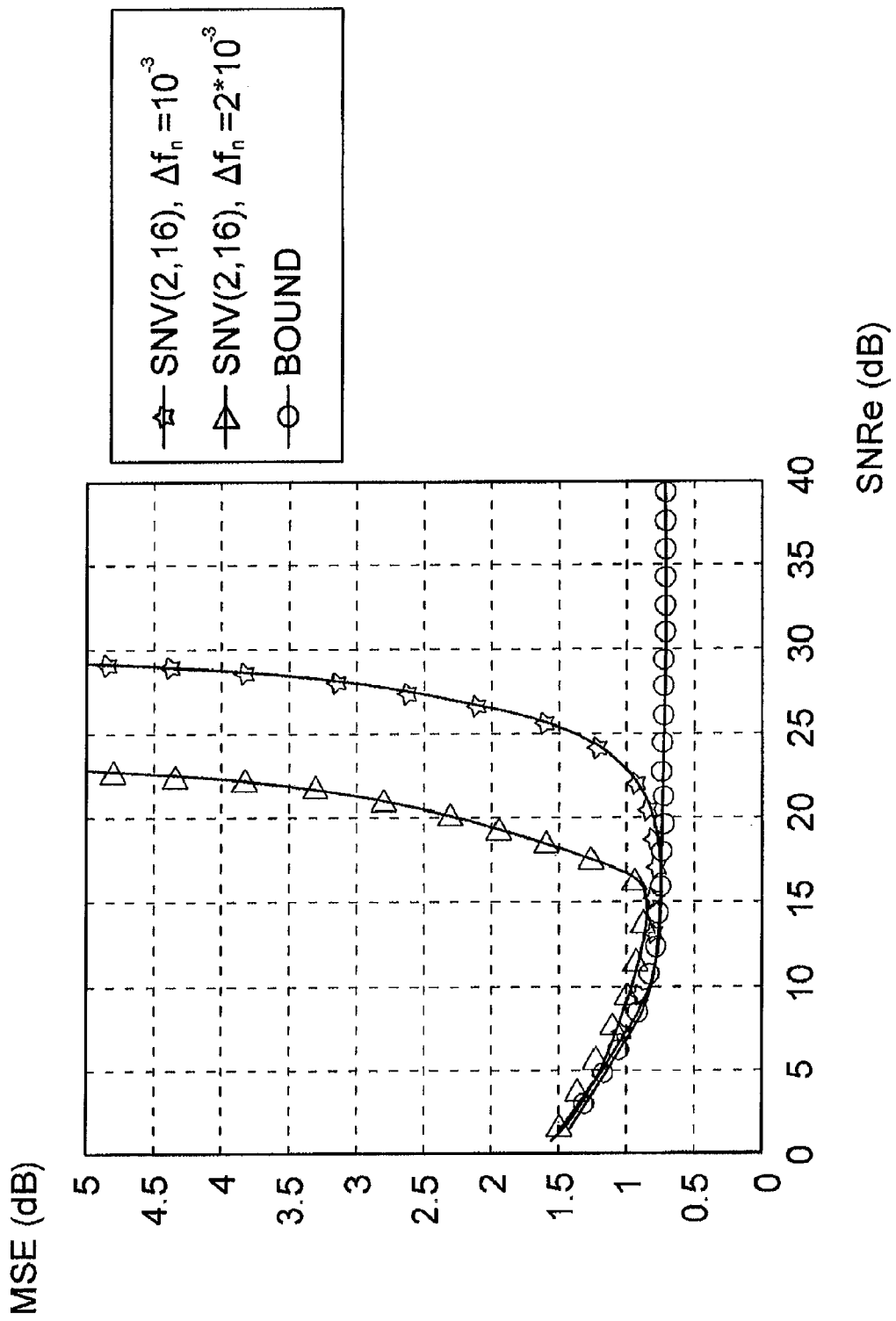
FIG. 5 is a graph of the mean square error MSE versus the value of the signal-to-noise ratio SNRe of the estimator in accordance with an embodiment.

FIG. 4 shows a graph of the estimated signal-to noise ratio SNRs versus the exact value SNRe over values of $\Delta f_n$ being $10^{-3}$ and $2\cdot 10^{-3}$ with B=2 and L=16 of the SNR estimator 100, indicated as SNVS(B, L), in accordance with an embodiment, whereas FIG. 5 shows a graph of the mean square error MSE against the value SNRe over values of $\Delta f_n$ being $10^{-3}$ and $2\cdot 10^{-3}$ with B=2 and L=16 of the SNR estimator in accordance with an embodiment; both graphs show an estimator in accordance with the known art for $\Delta f_n=0$, indicated as BOUND. From the values of FIGS. 2, 3 and FIGS. 4, 5, the improvement of the performances of the SNR estimator in accordance with an embodiment is apparent as compared to the estimator in accordance with the known art.

In accordance with another embodiment, assuming similarly to the above embodiment the channel gain G to be constant over the L samples and the condition $\Delta f_n l_b \cong \Delta f_n(l_b+L-1)$ to be satisfied, and assuming the number L, differently from the first embodiment, not to be sufficiently great to average the noise out, and with B>1, the following approximation may be carried out:

$$\frac{1}{B}\sum_{b=0}^{B-1}\left|\frac{1}{L}\sum_{k=l_b}^{l_b+L-1} r_k a_k^*\right|^2 \cong |\hat{G}|^2 + \frac{\sigma_n^2}{L}$$

and therefore the expression of the signal-to-noise ratio SNR calculated from the block 102 of the estimator 100 may use the following equation:

$$SNR = \left(1 - \frac{1}{L}\right) \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}$$

The SNR ratio comprises a weighting factor 1−1/L to weight the signal-to-noise ratio and a corrective term −1/L, it is noted that, if L is sufficiently great, the weighting factor (1−1/L) and the corrective term −1/L may be ignored, thus recovering the equation of the embodiment of the estimator discussed above. In some cases, the corrective term −1/L alone may be ignored.

From the equations relating to the signal-to-noise ratio SNR of the above described embodiments, it is apparent that for greater values of B the estimator is stronger with respect to the frequency offsets whereas for low values of L the estimator is more sensitive to the noise.

Figure 6:
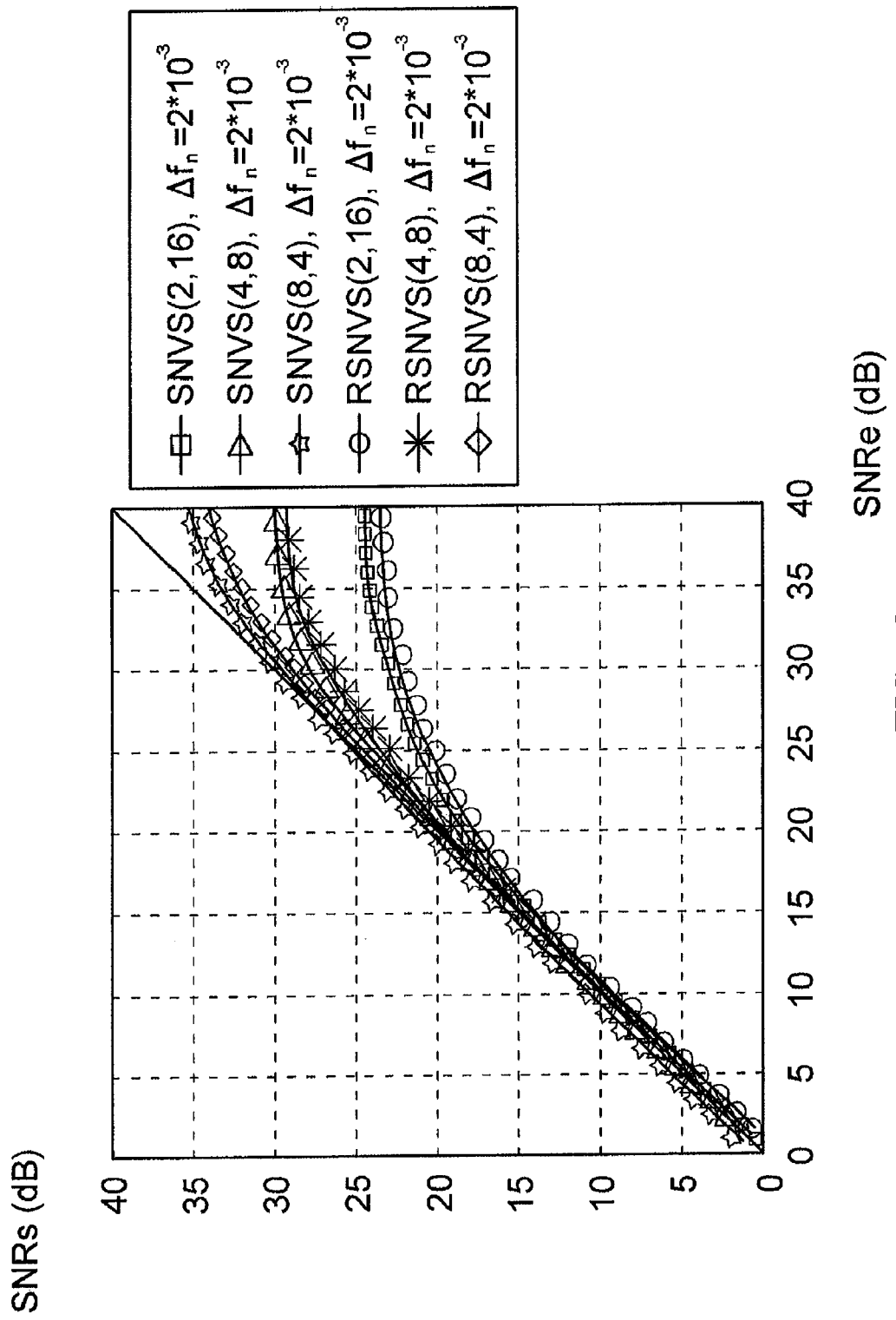
FIG. 6 is a graph of the estimated signal-to-noise ratio SNRs versus the exact value SNRe of the SNR estimator in accordance with two embodiments for some combinations of B and L.
Figure 7:
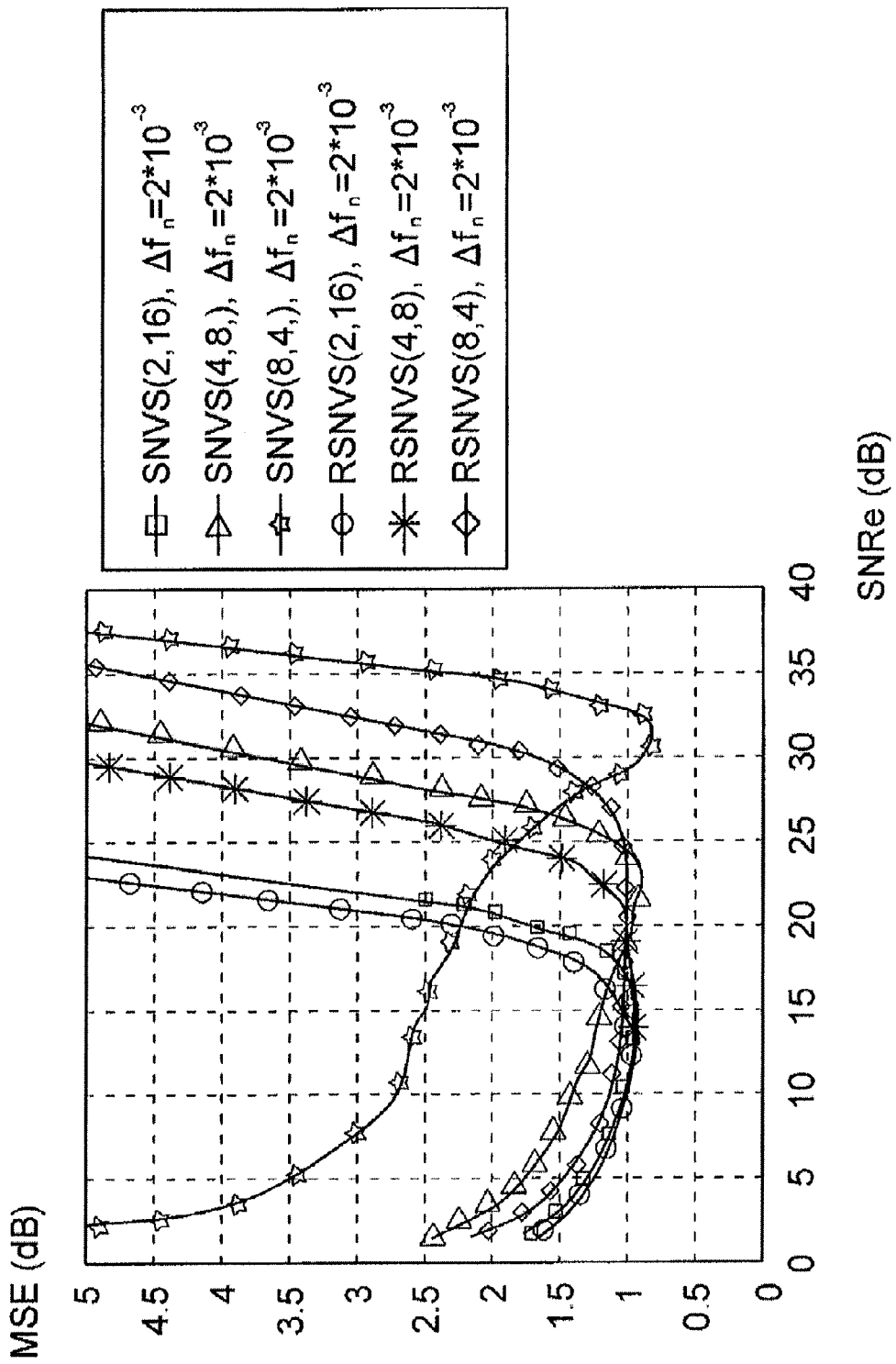
FIG. 7 is a graph of the mean square error MSE versus the value of the signal-to-noise ratio SNRe of the SNR estimator in accordance with two embodiments for some combinations of B and L.

FIG. 6 shows a graph of the estimated signal-to noise ratio SNRs versus the exact value SNRe over values of $\Delta f_n$ being $2 \cdot 10^{-3}$ with values of B being 2, 4, 8 and respective values of L being 16, 8, 4 of the SNR estimator in accordance with the above described embodiments, whereas FIG. 7 shows a graph of the mean square error MSE versus the value SNRe over values of $\Delta f_n$ being $2 \cdot 10^{-3}$ with values of B being 2, 4, 8 and respective values of L being 16, 8, 4 of the SNR estimator 100 in accordance with the first and second described embodiments; the estimator in accordance with the first described embodiment is indicated as SNVS(B, L), whereas that in accordance with the second described embodiment is indicated as RSNVS(B, L). From the values of FIGS. 6 and 7, the improvement of the RSNVS estimator performances is apparent as compared to the SNVS with low values of L.

In a third described embodiment, the divider block 101 of the SNR estimator 100, in addition to the division N=B·L, also allows to overlap consecutive blocks having a length L of a factor O with B>1. Given a known sequence having a length N, the number of possible divisions is given by $$B = \frac{N-L}{L-O} + 1 \geq \frac{N}{L}.$$

Defining $l_b=(L-O)\cdot b+l$, the SNR estimator 100 in accordance with an embodiment is configured to calculate the signal-to-noise ratio to be calculated with the block 102 using the following equation:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2}$$

In accordance with a fourth described embodiment, considered as a variant of the third embodiment, the block 102 of the estimator 100 comprises, similarly to the second embodiment, a weighting factor 1−1/L to weight the signal-to-noise ratio and a corrective term −1/L such that the calculation of the signal-to-noise ratio may be performed by the following equation:

$$SNR = \frac{\frac{L-1}{B \cdot L}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

It is noted that, similarly to the second embodiment, if L is sufficiently great, the weighting factor (1−1/L) and the corrective term −1/L may be ignored, thus recovering the equation of the third embodiment of the estimator. In some cases, the corrective term −1/L alone may be ignored.

Figure 8:
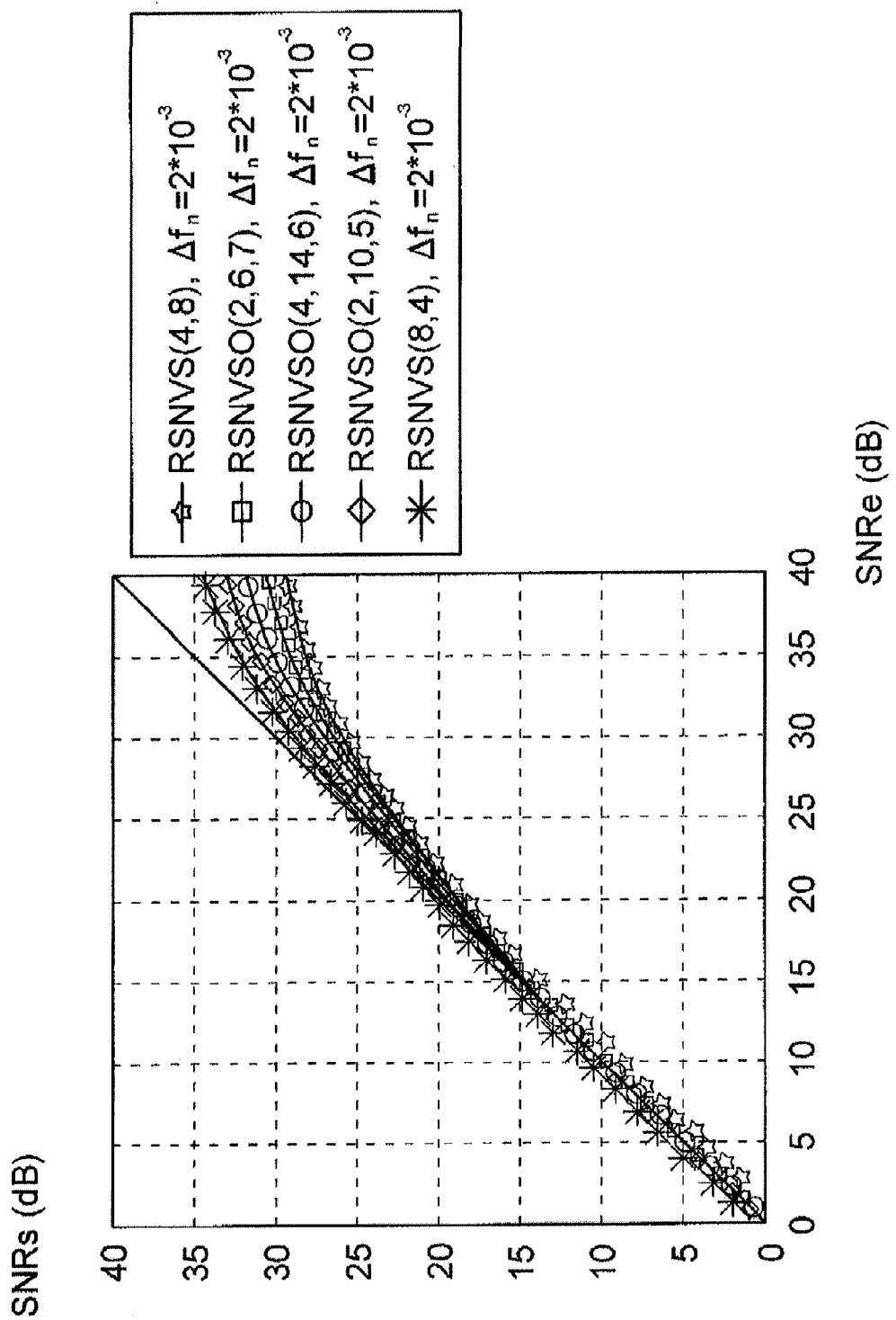
FIG. 8 is a graph of the estimated signal-to-noise ratio SNRs versus the exact value SNRe of the SNR estimator in accordance with an embodiment for some combinations of B and L and O.
Figure 9:
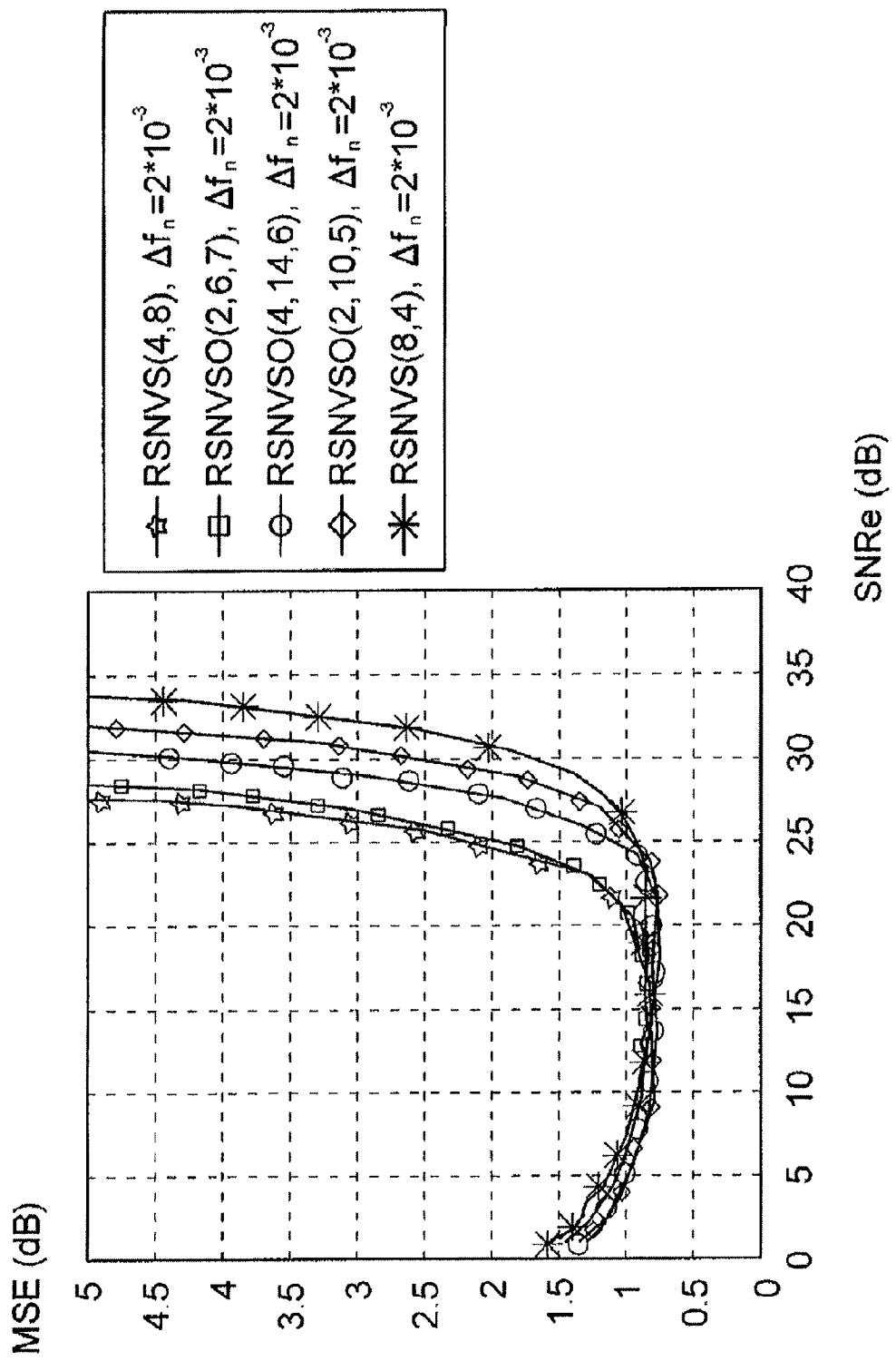
FIG. 9 is a graph of the mean square error MSE versus the value of the signal-to-noise ratio SNRe of the SNR estimator in accordance with an embodiment for some combinations of B and L and O.

Once N has been determined, more combinations of B and L may be obtained with good performances, as shown in FIGS. 8 and 9 where there are shown a graph of the estimated signal-to-noise ratio SNRs versus the exact value SNRe over values of $\Delta f_n$ being $2 \cdot 10^{-3}$ with values of B being 4, 6, 8, 10, 14 and L being 4, 5, 6, 7, 8 and 0 being 2, 4 of the SNR estimator in accordance with the second and fourth described embodiments, and a graph of the mean square error MSE versus the value SNRe over values of $\Delta f_n$ being $2 \cdot 10^{-3}$ with values of B being 4, 6, 8, 10, 14 and L being 4, 5, 6, 7, 8 and O being 2, 4 of the SNR estimator in accordance with the second and fourth embodiments, respectively, the estimator in accordance with the second embodiment is indicated as RSNVS(B, L) whereas the estimator in accordance with the fourth embodiment is indicated as RSNVSO(O, B, L).

The blocks 101 and 102 of the estimator 100 may comprise a microprocessor 103 and a memory 104 on which an application software is running thus causing the estimator 100 to perform the division N=B·L and in some embodiments also the overlapping of consecutive blocks having a length L of a factor O as previously specified and the execution of the calculation of the signal-to-noise ratio, for example according to any one of the preceding equations. In an embodiment, the estimator may comprise a look-up table for obtaining the number of blocks B of length L from the known number of symbols N.

A SNR estimator, for example the SNR 100 in accordance with the embodiments discussed above, may also be used for multiple carrier systems, such as the OFDM (Orthogonal Frequency Division Multiplexing) systems. In these transmission systems, there are multiple phenomena that may cause a progressive phase shifting of the received constellation, resulting in effects which are completely similar to the carrier frequency offset in the single carrier systems. It is for this reason that using the estimator may also be useful in multiple carrier systems, for example at the input of the differential demodulator, rather than the estimator in accordance with the known art. The phenomena responsible for the phase shifting of the received constellation may include: the carrier frequency offset, the packet synchronization offset and the sampling frequency offset. Each of these phenomena produces a different effect over the various subcarriers of the system and on the various symbols forming the transmitted packet. For example, the carrier frequency offset, in a passband system, produces a phase shifting of the constellation being constant on all the subcarriers of an OFDM symbol but increasing over time for every received OFDM symbol. On the other hand, the packet synchronization offset produces a rotation proportional to the subcarrier index, however remaining constant over all the OFDM symbols of the packet. The sampling frequency offset produces a rotation of the received constellation being different according to both the subcarrier index and the received OFDM symbol.

Figure 10:
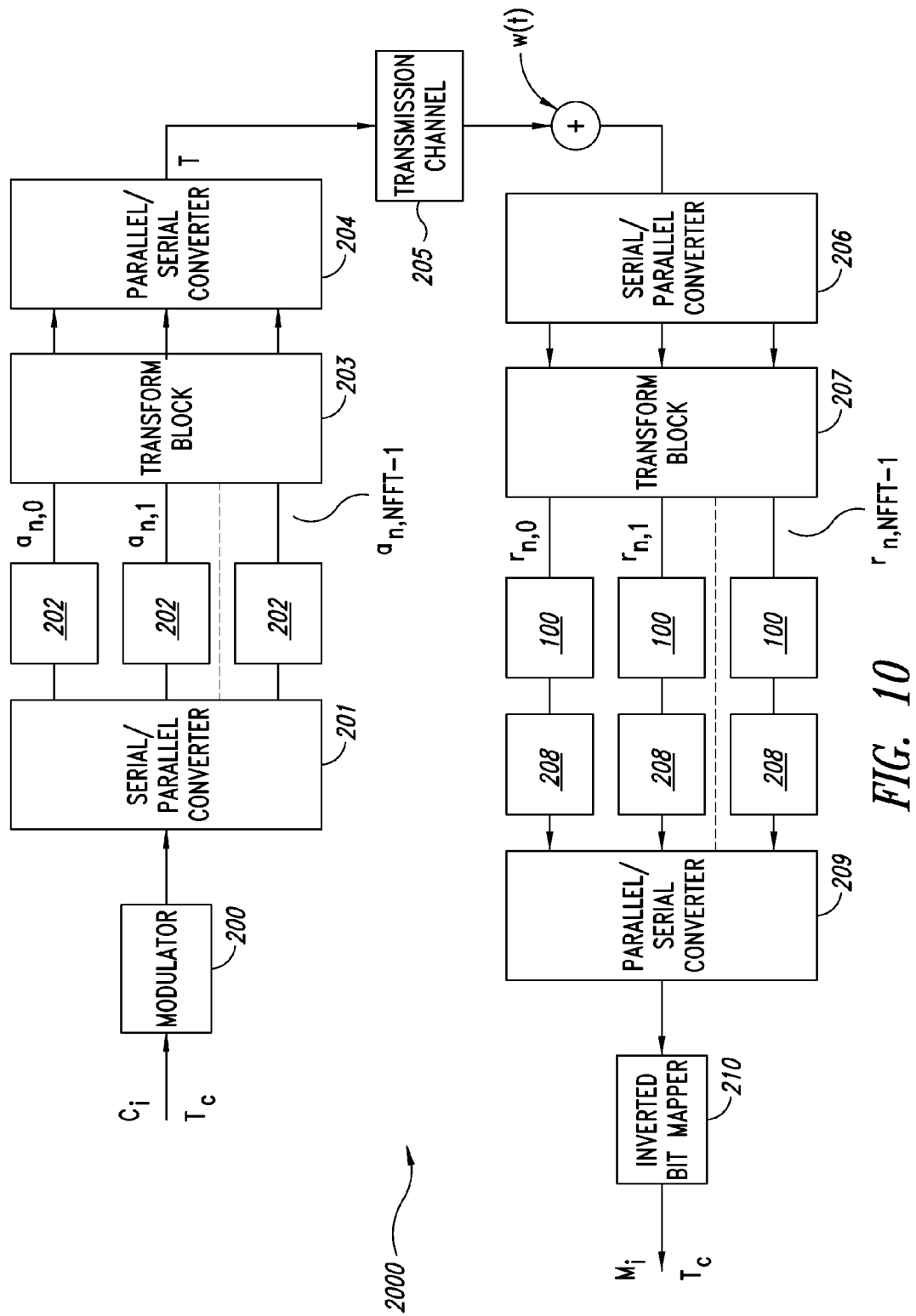
FIG. 10 is the equivalent base-band scheme of a pass-band packet transmission and reception multiple carrier system with M-DPSK modulator and demodulator and apparatus for estimating the signal-to-noise ratio in accordance with an embodiment.

Given the complexity of the phenomenon, in an OFDM system, a "data aided" SNR estimator may be implemented in different ways, based on the negative effect to be minimized. An SNR estimator may act on the frequency in the various carriers or over time between the different transmitted OFDM symbols. However, in any case, the known transmitted sequence of length N and the N received samples may be processed using B blocks of length L in order to reduce the negative effect of the rotation of the constellation in estimating the value of SNR. By way of non-limiting example, refer to a pass-band OFDM system where every subcarrier is M-DPSK modulated, i.e., the differential is achieved over time, and no recovery of the carrier frequency is achieved during the reception; an OFDM system 2000 in accordance with an embodiment is shown in FIG. 10. The M-PSK modulator 200 comprises a serial-to-parallel converter followed by a map which transforms a sequence of $\log_2 M$ bits $C_i$ into corresponding constellation points, $a'_j$. The M-PSK mapper 200 is followed by a serial-to-parallel converter 201 having $N_{FFT}$ outputs with values of $a'_{n,k}$ where n and k represent the index of the OFDM symbol and the index of the subcarrier, respectively, and having a duration of $$T \cdot N_{FFT}$$

where $$T = T_c \log_2 M,$$

being $T_c$ the information bit period. The M-DPSK modulator comprises $N_{FFT}$ differential blocks 202 configured to output signals $a_{n,0}, \ldots, a_{n,N_{FFT}-1}$, being $$a_{n,k} = a'_{n,k} \cdot a_{n-1,k'}$$

at the input of a transform block 203 configured to carry out the inverse Fourier transform of said signals and a block 204 configured to carry out the parallel-to-serial conversion of the signals. The obtained signals are at the input of a channel 205 with a transfer function G(f).

OFDM systems, like the OFDM system 2000 of FIG. 10, may allow the signal band to be divided into sub-bands in which the transfer function of the channel G(f) may be approximated as almost flat. Under these conditions, an estimator may independently be applied to every OFDM subcarrier. Once the noise w(t) has been added, the passage through the serial-to-parallel converter 206 and the block for applying the Fourier transform 207, in the presence of an offset between the carrier frequency of the transmitter and receiver, the sample relating to the $n^{th}$ symbol and the $n^{th}$ subcarrier has the following expression:

$$r_{n,h} = \sum_{k=0}^{N_{FFT}-1} a_{n,k} G_k \operatorname{sinc}_{N_{FFT}}$$

$$\left(k + \Delta f \frac{N_{FFT}}{F} - h\right) e^{-j\pi\left(k+\Delta f \frac{N_{FFT}}{F} - h\right)\frac{N_{FFT}-1}{N_{FFT}}} + W_{n,h}$$

where $a_{n,k}$ and $G_k$ are the transmitted M-DPSK symbol and the complex coefficient of the channel gain on the $k^{th}$ subcarrier, respectively, $W_{n,h}$ represents the noise after the discrete Fourier transform (DFT), $N_{FFT}$ is the number of subcarriers, F=1/T is the sampling frequency and the function $$\operatorname{sinc}_N(x) = \frac{1}{N} \cdot \frac{\sin \pi x}{\sin \frac{\pi}{N} x}$$

The preceding relation may be written as:

$$r_{n,h} = \left(a_{n,h} G_h \operatorname{sinc}_{N_{FFT}}\left(\Delta f \frac{N_{FFT}}{F}\right)\right) e^{j\pi \frac{\Delta f N_{FFT}-1}{F N_{FFT}}} + I_{n,h} + W_{n,h}$$

where $$I_{n,h} = \sum_{\substack{k=0 \\ k \neq h}}^{N_{FFT}-1} a_{n,k} G_k \operatorname{sinc}_{N_{FFT}}$$

$$\left(k + \Delta f \frac{N_{FFT}}{F} - h\right) e^{j\pi\left(k+\Delta f \frac{N_{FFT}}{F} - h\right)\frac{N_{FFT}-1}{N_{FFT}}}$$

represents the channel interference due to the frequency offset $\Delta f$, said term degrades the performances of the OFDM systems and makes the SNR estimators 100 more sensitive to the frequency offset as compared to single carrier transmission and reception systems. The frequency offset determines a phase rotation for the received symbols being constant over all the subcarriers, said phase rotation is proportional to the normalized frequency offset $\Delta f_n$ with respect to the sampling frequency F, $$\Delta f_n = \Delta f / F = \Delta f \cdot T.$$

The samples $r_{n,0}, \ldots, r_{n,N_{FFT}-1}$ are at the input of the SNR estimators 100 and then at the input of the M-DPSK receivers 208, parallel-to-serial converter 209, inverted mapper 210 in order to have the estimated bits $m_i$ corresponding to the bits $c_i$ at the output.

It is noted that the SNR estimator in the described embodiments is applied at the input of the differential demodulator: if the SNR estimator is applied at the output of the differential demodulator there is a greater insensitivity to the frequency offset, the disadvantage being the noise amplification.

Figure 11:
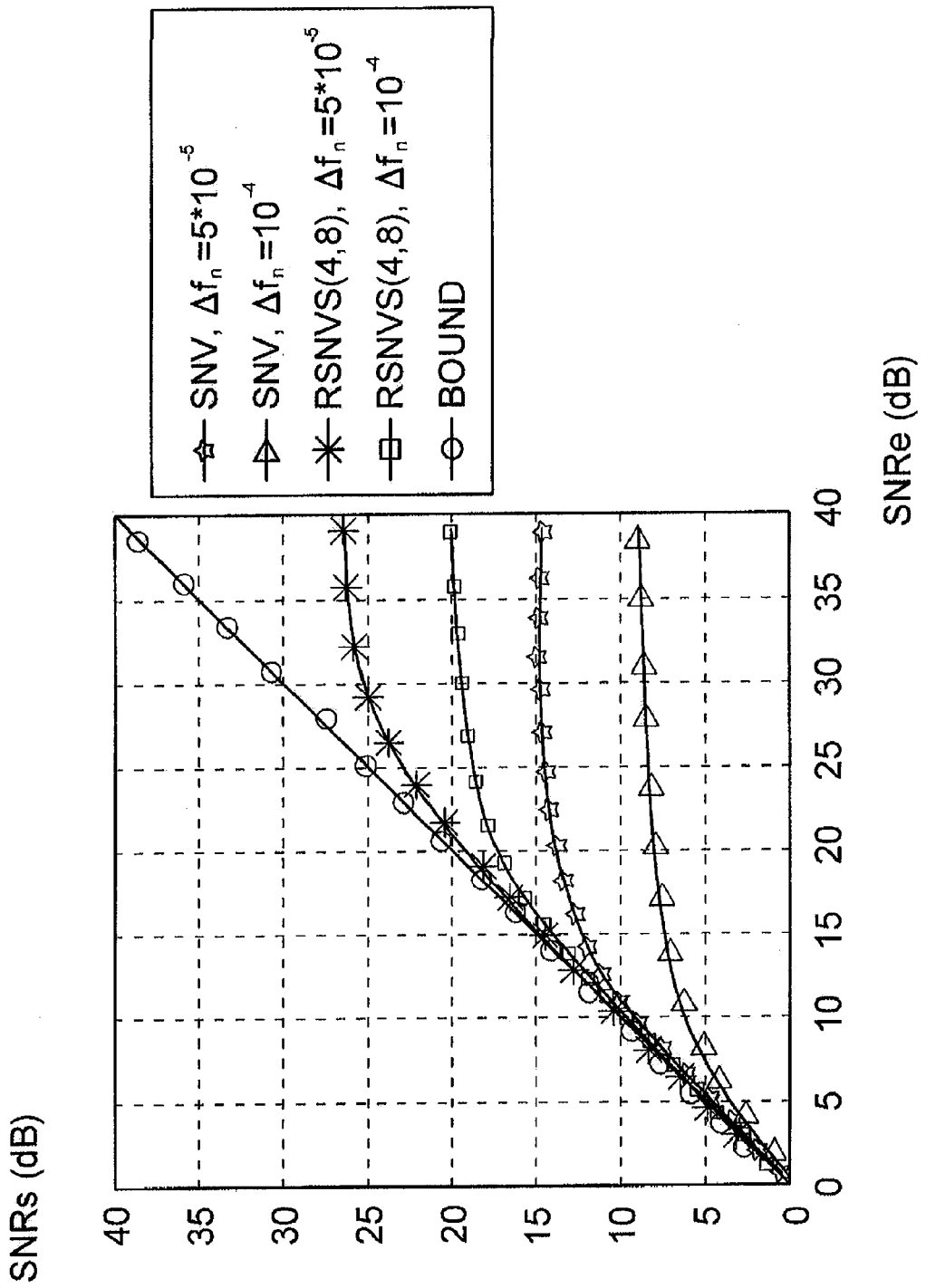
FIG. 11 is a graph of the estimated signal-to-noise ratio SNRs versus the exact value SNRe of the SNR estimator in accordance with an embodiment for a multiple carrier transmission and reception system.
Figure 12:
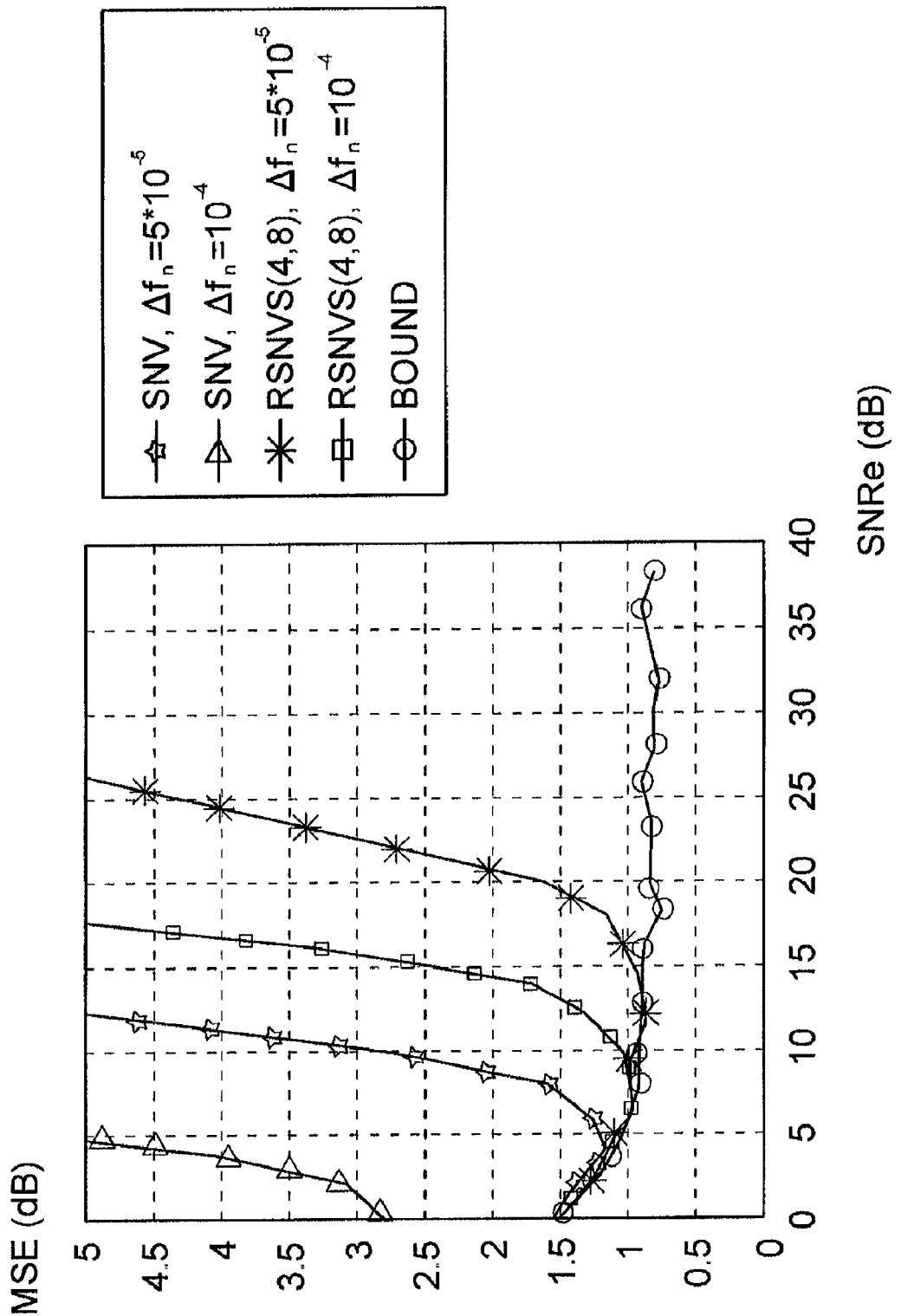
FIG. 12 is a graph of the mean square error MSE versus the value of the signal-to-noise ratio SNRe of the SNR estimator in accordance with an embodiment for a multiple carrier transmission and reception system.

In the graphs of FIGS. 11 and 12, there are shown the estimated signal-to-noise ratio SNRs versus the exact value SNRe over values of $\Delta f_n$ being $10^{-4}$ and $5 \cdot 10^{-5}$ of the SNR estimator for a single carrier in accordance with the known art and the second embodiment being B=4 and L=8 and the mean square error MSE versus the value SNRe over values of $\Delta f_n$ being $10^{-4}$ and $5 \cdot 10^{-5}$ of the SNR estimator in accordance with the known art and the second embodiment being B=4 and L=8, respectively; the estimator in accordance with the known art is indicated as SNV whereas the estimator in accordance with the second embodiment is indicated as RSNVS(B, L). Both graphs show the estimator in accordance with the known art for $\Delta f_n=0$, indicated as BOUND.

From the values of FIGS. 11 and 12, the improvement of the RSNVS estimator performances is apparent as compared to the SNV estimator.

The used pass-band single carrier communication system of an embodiment works at a carrier frequency of 100 kHz and has a system clock having a tolerance of ±200 ppm or ±100 ppm and a sampling frequency being F=10 kHz with the SNR estimator applied at the input of the differential demodulator.

The used pass-band multiple carrier communication system of an embodiment works at a carrier frequency of 250 kHz and has a system clock having a tolerance of ±40 ppm or ±20 ppm and a sampling frequency being F=100 kHz with the SNR estimator applied at the input of the differential demodulator. A person skilled in the art may make modifications, adaptations and replacements of elements with others functionally equivalent to the embodiments described above so as to satisfy contingent requirements while remaining within the scope of protection of the following claims. Each of the characteristics described as pertaining to a possible embodiment may be realized independently of the other embodiments described.

The foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). In one embodiment, the present subject matter may be implemented via one or more digital signal processors executing, for example, instructions stored on one or more memories. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, using discrete circuitry, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could be any suitable medium upon which the program associated with logic and/or information can be electronically captured, via for instance optical scanning, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    receiving a modulated signal, the signal comprising a sequence of N known transmitted symbols modulated using M-ary Differential Phase Shift Keying (M-DPSK) modulation with at least one carrier; and
    estimating, using at least one processor, a signal-to-noise ratio based on a division of N samples of the received signal and of the N known transmitted symbols into a number of blocks B of a length L, with N, B and L being positive integer values with B>1 and L<N.

2. The method of claim 1 wherein the estimating the signal-to-noise ratio based on the number of blocks B and the length L comprises estimating the signal-to-noise ratio based on a complex conjugate of the M-DPSK known transmitted symbols.

3. The method of claim 2 wherein the estimating the signal-to-noise ratio based on the number of blocks B and the length L is performed according to:

$$SNR = \left(1 - \frac{1}{L}\right) \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L} =$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}$$

wherein $l_b = L \cdot b + l$, $l$ is an index denoting a position of a first known symbol of the sequence of length N in a packet, $r_k$ is a sample of the received signal at an output of a channel correspondent to a known transmitted symbol, $a_k$ is the M-DPSK known transmitted symbol, $a_k^*$ is a complex conjugate of the M-DPSK known transmitted symbol and SNR indicates an estimation of the signal-to-noise ratio.

4. The method according to claim 2 wherein when the length L of the blocks B is greater than a threshold, the estimation of the signal-to-noise ratio is given by:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2},$$

wherein $l_b = L \cdot b + l$, l is an index denoting a position of a first known symbol of the sequence of length N in a packet, $r_k$ is a sample of the received signal at an output of a channel correspondent to a known transmitted symbol, $a_k$ is the M-DPSK known transmitted symbol, $a_k^*$ is a complex conjugate of the M-DPSK known transmitted symbol and SNR indicates an estimation of the signal-to-noise ratio.

5. The method according to claim 2 wherein $$B = \frac{N-L}{L-O} + 1 \geq \frac{N}{L}$$

factor of consecutive blocks having length L, and estimation of the signal-to-noise ratio being given by:

$$SNR = \frac{\frac{(L-1)}{B \cdot L}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L},$$

wherein $l_b = L \cdot b + l$, l is an index denoting a position of a first known symbol of the sequence of length N in a packet, $r_k$ is the a sample of the received signal at an output of a channel correspondent to a known transmitted symbol, $a_k$ is the M-DPSK known transmitted symbol, $a_k^*$ is the a complex conjugate of the M-DPSK known transmitted symbol and SNR indicates an estimation of the signal-to-noise ratio.

6. The method according to claim 1, further comprising:
  filtering the received modulated signal; and
  applying non-coherent type differential demodulation to the filtered signal after estimation of the signal-to-noise ratio.

7. The method according to claim 1 wherein the at least one carrier comprises multiple carriers.

8. An apparatus, comprising:
  a module configured to obtain a number B of blocks of a length L based on a division of a number N of known symbols and of a number N of samples of a received signal at an output of a channel, with N, B and L being positive integer values, and B greater than one; and
  an estimator configured to estimate, based on the number of blocks B and the length L, a signal-to-noise ratio of the received signal comprising a sequence of the N known symbols modulated using M-ary Differential Phase Shift Keying (M-DPSK) modulation with at least one carrier signal.

9. The apparatus of claim 8, wherein the module configured to obtain the number of blocks B comprises a divider configured to divide the N known symbols and N samples of the received signal at the output of the channel into the number of blocks B of the length L.

10. The apparatus of claim 8 wherein the estimator is configured to estimate the signal-to-noise according to:

$$SNR = \left(1 - \frac{1}{L}\right)\frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}$$

wherein $l_b = L \cdot b + l$, l is an index denoting a position of a first known symbol of the sequence of length N in a packet, $r_k$ is a sample of the received signal at the output of the channel correspondent to a known transmitted symbol, $a_k$ is the M-DPSK known transmitted symbol, $a_k^*$ is a complex conjugate of the M-DPSK known transmitted symbol and SNR indicates an estimation of the signal-to-noise ratio.

11. The apparatus according to claim 8 wherein if the length L of the blocks B is greater than a threshold, the estimator is configured to estimate the signal-to-noise ratio according to $$SNR = \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2},$$

wherein $l_b = L \cdot b + l$, l is an index denoting a position of a first known symbol of the sequence of length N in a packet, $r_k$ is a sample of the received signal at the output of the channel correspondent to a known transmitted symbol, $a_k$ is the M-DPSK known transmitted symbol, $a_k^*$ is a complex conjugate of the M-DPSK known transmitted symbol and SNR indicates an estimation of the signal-to-noise ratio.

12. The apparatus according to claim 8 wherein $$B = \frac{N-L}{L-O} + 1 \geq \frac{N}{L}$$

wherein O indicates an overlapping factor of consecutive blocks having length L, and estimation of the signal-to-noise ratio being given by:

$$SNR = \frac{\frac{(L-1)}{B \cdot L} \sum_{b=0}^{B-1} \left| \frac{1}{L} \sum_{k=l_b}^{l_b+L-1} r_k a_k^* \right|^2}{\frac{1}{B} \sum_{b=0}^{B-1} \frac{1}{L} \sum_{k=l_b}^{l_b+L-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L},$$

wherein $l_b = L \cdot b + 1$, l is an index denoting a position of a first known symbol of the sequence of length N in a packet, $r_k$ is a sample of the received signal at the output of the channel correspondent to a known transmitted symbol, $a_k$ is the M-DPSK known transmitted symbol, $a_k^*$ is a complex conjugate of the M-DPSK known transmitted symbol and SNR indicates an estimation of the signal-to-noise ratio.

13. The apparatus of claim 8, further comprising:
a filter configured to filter the received signal; and
a differential demodulator configured to demodulate the received signal and to receive as an input the estimated signal-to-noise ratio.

14. The apparatus of claim 8 wherein the at least one carrier signal comprises a plurality of carrier signals.

15. A computer-readable memory medium whose contents cause at least one processor to perform a method, the method comprising:
obtaining a number of blocks B of a length L based on a division of a number of known symbols N and of N samples of a received signal at an output of a channel into the number of blocks B of length L, with B, L and N positive integer values, and B greater than one; and
estimating, based on the number of blocks B and the length L, a signal-to-noise ratio of a received signal comprising a sequence of the N known symbols modulated using M-ary Differential Phase Shift Keying (M-DPSK) modulation with at least one carrier signal.

16. The computer-readable memory medium of claim 15 wherein the method further comprises differential demodulation of the received signal.

17. The computer-readable medium of claim 15 wherein the obtaining comprises dividing the N known symbols and N samples of the received signal at the output of the channel into the number of blocks B of length L.

18. The computer-readable medium of claim 15 wherein B is greater than N divided by L.

19. A system, comprising:
a differential demodulator configured to demodulate a received signal comprising a sequence of N known symbols modulated using M-ary Differential Phase Shift Keying (M-DPSK) modulation with at least one carrier signal; and
an estimator configured to estimate a signal-to-noise ratio of the received signal based on a division of the N known symbols and of N samples of the received signal at an output of a channel into a number of blocks B of length L, with N, B and L being positive integer values, and B greater than one.

20. The system of claim 19 wherein the estimator comprises a divider configured to divide the known symbols N and N samples of the received signal at the output of the channel into the number of blocks B of the length L.

21. The system of claim 19, further comprising a filter.

22. The system of claim 19, further comprising a transmitter configured to transmit a signal, wherein the differential demodulator and the estimator are configured to receive the transmitted signal.

23. The system of claim 19 further comprising a transmitter configured to transmit modulated signals.

24. A system comprising:
means for obtaining a number of blocks B of a length L based on a division of a sequence of known symbols N and of N samples of a received signal at an output of a channel into the number of blocks B; and
means for estimating, based on the number of blocks B and the length L, a signal-to-noise ratio of a received signal comprising a sequence of the N known symbols modulated using M-ary Differential Phase Shift Keying (M-DPSK) modulation with at least one carrier signal.

25. A method for estimating a signal-to-noise ratio for a packet transmission and reception system of signals having a known data sequence by means of a M-DPSK modulation with at least one carrier, said system comprising packet transmission of a signal with a sequence of N known symbols, with N positive integer number, said transmission comprising a M-DPSK modulation of the signal to transmit by means of a M-PSK mapper and a differential block, the transmission of the M-DPSK modulated signal (s(t)) through a channel having constant gain (G) over all the N symbols and in presence of noise (w(t)) with null average, and reception of a signal (r(t)) at the output of the channel, said method comprises estimation of a signal-to-noise ratio of the received signal with the division of the N known symbols ($a_k$) and of the N samples ($r_k$) of the signal (r(t)) at the output of the channel into B blocks of L length with B and L positive integer numbers and B greater than one and wherein B is expressed by $$B = \frac{N-L}{L-O} + 1 \geq \frac{N}{L}$$

wherein O indicates an overlapping factor of consecutive blocks having length L and calculation of the estimation of the signal-to-noise ratio by means of an equation:

$$SNR = \frac{\frac{(L-1)}{B \cdot L} \sum_{b=0}^{B-1} \left| \frac{1}{L} \sum_{k=l_b}^{l_b+L-1} r_k a_k^* \right|^2}{\frac{1}{B} \sum_{b=0}^{B-1} \frac{1}{L} \sum_{k=l_b}^{l_b+L-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}$$

wherein $l_b = b \cdot (L-O) + 1$ where l is an index denoting a position of a first known symbol of the sequence of length N in the packet, $r_k$ is a sample of the received signal at the output of the channel correspondent to a known transmitted symbol, $a_k$ is the M-DPSK modulated known transmitted symbol, $a_k^*$ is a complex conjugate of the M-DPSK modulated known transmitted symbol and SNR indicates the estimation of the signal-to-noise ratio.

26. The method according to claim 25 wherein when O=0 the B blocks are expressed by $$B = \frac{N}{L}$$

and said estimation of the signal-to-noise ratio is given by:

$$SNR = \left(1 - \frac{1}{L}\right) \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}..$$

27. The method according to claim 25 wherein when the length L of the blocks B is sufficient great to average the noise, said estimation of the signal-to-noise ratio is given by:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2}.$$

28. The method according to claim 25 wherein said transmission and reception system is of a pass-band type and the reception is of a non-coherent type with differential demodulation, said estimation of the signal-to-noise ratio being effectuated before the differential demodulation of the signal.

29. The method according to claim 25 wherein said transmission and reception system is of a multiple carrier type.

30. An apparatus to estimate a signal-to-noise ratio for a packet transmission and reception system of signals having a known data sequence by means of a M-DPSK modulation with at least one carrier, said system comprising means for the packet transmission of a signal with a sequence of N known symbols, with N positive integer number, said transmission means comprising a M-DPSK modulator of the signal to transmit comprising a M-PSK mapper and a differential block, said M-DPSK modulated signal (s(t)) being adapted to pass through a channel having constant gain (G) over all the N symbols and in presence of noise (w(t)) with null average, said system comprises means (10) for receiving a signal (r(t)) at an output of the channel, said apparatus comprising first means adapted to divide the N known symbols ($a_k$) and N samples ($r_k$) of the signal (r(t)) at the output of the channel into B blocks of L length with B and L positive integer numbers and B greater than one and said first means (101) being adapted to overlap consecutive blocks having length L of a factor O, said B blocks being expressed by $$B = \frac{N-L}{L-O} + 1 \geq \frac{N}{L}$$

wherein O indicates an overlapping factor of consecutive blocks having length L, and second means adapted to calculate the estimation of the signal-to-noise ratio by means of an equation:

$$SNR = \frac{\frac{(L-1)}{B \cdot L}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

wherein $-l_b=(L-O)\cdot b+l$ where l is an index denoting a position of a first known symbol of the sequence of length N in the packet, $r_k$ is a sample of the received signal at the output of the channel correspondent to a known transmitted symbol, $a_k$ is the M-DPSK modulated known transmitted symbol, $a_k^*$ is a complex conjugate of the M-DPSK modulated known transmitted symbol and SNR indicates the estimation of the signal-to-noise ratio.

31. The apparatus according to claim 30 wherein O=0 and said second means being adapted to effectuate the estimation of the signal-to-noise ratio by an equation:

$$SNR = \left(1 - \frac{1}{L}\right) \frac{\frac{1}{B}\sum_{b=0}^{B-1}\left|\frac{1}{L}\sum_{k=l_b}^{l_b+L-1} r_k a_k^*\right|^2}{\frac{1}{N}\sum_{k=l}^{l+N-1}|r_k|^2 - \frac{1}{B}\sum_{b=0}^{B-1}\left|\frac{1}{L}\sum_{k=l_b}^{l_b+L-1} r_k a_k^*\right|^2} - \frac{1}{L}$$

$$= \frac{(L-1)\sum_{b=0}^{B-1}\left|\frac{1}{L}\sum_{k=l_b}^{l_b+L-1} r_k a_k^*\right|^2}{\sum_{k=l}^{l+N-1}|r_k|^2 - L\sum_{b=0}^{B-1}\left|\frac{1}{L}\sum_{k=l_b}^{l_b+L-1} r_k a_k^*\right|^2} - \frac{1}{L}.$$

32. The apparatus according to claim 30 wherein when the length L of the blocks B is sufficient great to average the noise said second means are adapted to calculate the estimation of the signal-to-noise ratio by an equation:

$$SNR = \frac{\frac{1}{B}\sum_{b=0}^{B-1}\left|\frac{1}{L}\sum_{k=l_b}^{l_b+L-1} r_k a_k^*\right|^2}{\frac{1}{B}\sum_{b=0}^{B-1}\frac{1}{L}\sum_{k=l_b}^{l_b+L-1}|r_k|^2 - \frac{1}{B}\sum_{b=0}^{B-1}\left|\frac{1}{L}\sum_{k=l_b}^{l_b+L-1} r_k a_k^*\right|^2}.$$

33. The apparatus according to claim 30 wherein said transmission and reception system is of a pass-band type, said reception means of the signal effectuating a non-coherent reception and comprising a differential demodulator, said estimation apparatus being adapted to calculate the estimation of the signal-to-noise ratio of the signal at an input of the differential demodulator.

34. The apparatus according to claim 6 wherein said transmission and reception system is of a multiple carrier type.

35. A packet transmission and reception system of signals having a known data sequence by means of a M-DPSK modulation with at least one carrier, said system comprising means for packet transmission of a signal with a sequence of N known symbols, with N positive integer number, said transmission means comprising a M-DPSK modulator of the signal to transmit comprising a M-PSK mapper and a differential block, said M-DPSK modulated signal (s(t)) being adapted to pass through a channel having constant gain (G) over all the N symbols and in presence of noise (w(t)) with null average, said system comprising means for receiving a signal (r(t)) at the output of the channel which comprises a differential demodulator, said system including an apparatus comprising first means adapted to divide the N known symbols ($a_k$) and N samples ($r_k$) of the signal (r(t)) at the output of the channel into B blocks of L length with B and L positive integer numbers and B greater than one and said first means (101) being adapted to overlap consecutive blocks having length L of a factor O, said B blocks being expressed by $$B = \frac{N-L}{L-O} + 1 \geq \frac{N}{L}$$

wherein O indicates an overlapping factor of consecutive blocks having length L, and second means adapted to calculate the estimation of the signal-to-noise ratio by means of an equation:

$$SNR = \frac{\frac{(L-1)}{B \cdot L} \sum_{b=0}^{B-1} \left| \frac{1}{L} \sum_{k=l_b}^{l_b+L-1} r_k a_k^* \right|^2}{\frac{1}{B} \sum_{b=0}^{B-1} \frac{1}{L} \sum_{k=l_b}^{l_b+L-1} |r_k|^2 - \frac{1}{B} \sum_{b=0}^{B-1} \left| \frac{1}{L} \sum_{k=l_b}^{l_b+L-1} r_k a_k^* \right|^2} - \frac{1}{L}$$

wherein $l_b = (L-O) \cdot b + l$, l where l is an index denoting a position of a first known symbol of the sequence of length N in the packet, $r_k$ is a sample of the received signal at the output of the channel correspondent to a known transmitted symbol, $a_k$ is the M-DPSK modulated known transmitted symbol, $a_k^*$ is a complex conjugate of the M-DPSK modulated known transmitted symbol and SNR indicates an estimation of the signal-to-noise ratio.

* * * * *

UNITED STATES PATENT AND TRADEMARK OFFICE
CERTIFICATE OF CORRECTION

PATENT NO.        : 8,363,760 B2                              Page 1 of 1
APPLICATION NO.   : 12/646348
DATED             : January 29, 2013
INVENTOR(S)       : Paola Bisaglia et al.

It is certified that error appears in the above-identified patent and that said Letters Patent is hereby corrected as shown below:

In the Claims

Column 19, Claim 5, Lines 43-44:
"known symbol of the sequence of length N in a packet, $r_k$ is the a sample of the received signal at an output of a channel" should read, --known symbol of the sequence of length N in a packet, $r_k$ is a sample of the received signal at an output of a channel--.

Column 19, Claim 5, Line 46:
"M-DPSK known transmitted symbol, $a_k^*$ is the a complex" should read, --M-DPSK known transmitted symbol, $a_k^*$ is a complex--.

Column 20, Claim 11, Line 51:
"known symbol of the sequence of length N in a packet, $r_k$ is a" should read, --known symbol of the sequence of length N in a packet, $r_k$ is a--.

Column 26, Claim 35, Lines 10-11:
"wherein $l_b$=(L-O)·b+l, 1 where l is an index denoting a position of a first known symbol of the sequence of length N in the" should read, --wherein $l_b$=(L-O)·b+l, where l is an index denoting a position of a first known symbol of the sequence of length N in the--.

Signed and Sealed this
Seventh Day of January, 2014

Margaret A. Focarino
*Commissioner for Patents of the United States Patent and Trademark Office*